Patented Oct. 12, 1937

2,095,740

UNITED STATES PATENT OFFICE 2,095,740

ANTIOXIDANT

Donald P. Grettie, Chicago, Ill., assignor to Industrial Patents Corporation, Chicago, Ill., a corporation of Delaware No Drawing. Application November 12, 1934, Serial No. 752,695

6 Claims. (Cl. 99—163)

This invention relates to an antioxidant for fats and oils and more particularly to an antioxidant for inhibiting rancidity in shortening products such as lard.

One of the objects of the present invention is to provide an antioxidant for use with edible fats and oils.

Another object of the invention is to provide a method for preparing such an antioxidant.

For the purpose of illustration but not by way of limitation I will describe the invention as practiced with lard.

The present invention is based upon the discovery that the tendency of lard to become rancid can be retarded by the addition of a distillate which may be secured as a by-product of the deodorizing of hydrogenated sesame seed oil. This substance is a heavier-than-water liquid which may be experimentally collected in the condensing flask when deodorizing hydrogenated sesame seed oil. In large scale operations this distillate which is carried over and condensed with the deodorizing steam may be collected from the hot well.

The antioxidant properties of this substance may be determined by an experiment which yielded the following data:

(1) Prime steam lard control
(2) Prime steam lard + .006% of oily liquid in condensing flask after deodorization of hydrogenated sesame seed oil

| Hours incubation at 70° C. | Active oxygen No. | |
|---|---|---|
| | (1) | (2) |
| 24 | 3.5 | 4.0 |
| 48 | 7.0 | 5.0 |
| 71 | 23.0 faintly rancid | 8.0 |
| 92 | 54.0 | 17.0 |
| 137 | | 68.0 Rancid |

It will be seen from the foregoing table that very small percentages of the distillate are sufficient to bring about a marked inhibition of rancidity.

The active oxygen method to which reference is made in the foregoing is described in the article entitled "An accelerated stability test using the peroxide value as an index" contributed to the journal "Oil and Soap" of June 1933, by A. E. King, H. L. Roschen, and W. H. Irwin, Volume X, number 6, pages 105–109.

This is a test which has been found satisfactory in practice and depends upon the peroxide content for identification of the rancid point.

Although by way of illustration I have discussed lard in describing my invention, it will be understood that the present invention is not limited to lard but comprehends edible vegetable fats and oils adapted for use as shortening and the like.

The word "shortening" as used in this specification and in the claims which follow shall be understood to include edible animal and vegetable fats and oils such as lard, beef fat, hydrogenated cottonseed oil, cottonseed oil, compounds and the like irrespective of the use to which the substance may be put.

Having thus described my invention, I claim:

1. The method of stabilizing lard which comprises adding thereto and thoroughly incorporating therewith a quantity of a distillate secured by the deodorization of hydrogenated sesame seed oil.

2. The method of stabilizing lard which comprises adding thereto and thoroughly incorporating therewith a relatively small quantity of a distillate secured by the deodorization of hydrogenated sesame seed oil.

3. The method of stabilizing shortening which comprises adding thereto and thoroughly incorporating therewith a quantity of a distillate secured by the deodorization of hydrogenated sesame seed oil.

4. The method of stabilizing shortening which comprises adding thereto and thoroughly incorporating therewith a relatively small quantity of a distillate secured by the deodorization of hydrogenated sesame seed oil.

5. As an article of commerce, a shortening product stabilized against rancidity, consisting of a large percentage of shortening and a complement of a distillate secured by the deodorization of hydrogenated sesame seed oil.

6. As an article of commerce, a shortening product stabilized against rancidity, consisting of a large percentage of lard and a complement of a distillate secured by the deodorization of hydrogenated sesame seed oil.

DONALD P. GRETTIE.